(12) United States Patent
Roberge

(10) Patent No.: US 7,882,695 B2
(45) Date of Patent: Feb. 8, 2011

(54) TURBINE BLOW DOWN STARTER FOR TURBINE ENGINE

(75) Inventor: Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 921 days.

(21) Appl. No.: 11/719,805

(22) PCT Filed: Dec. 1, 2004

(86) PCT No.: PCT/US2004/039998

§ 371 (c)(1),
(2), (4) Date: May 21, 2007

(87) PCT Pub. No.: WO2006/112807

PCT Pub. Date: Oct. 26, 2006

(65) Prior Publication Data

US 2009/0145135 A1    Jun. 11, 2009

(51) Int. Cl.
*F02K 3/02*    (2006.01)
(52) U.S. Cl. .................. 60/226.1; 60/786; 60/204
(58) Field of Classification Search .......... 60/204, 60/727, 772, 786–788, 226.1
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,320 A * | 11/1961 | Paiement ............ 60/787 |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |

(Continued)

FOREIGN PATENT DOCUMENTS

GB    716263    9/1954

(Continued)

*Primary Examiner*—Michael Cuff
*Assistant Examiner*—Phutthiwat Wongwian
(74) *Attorney, Agent, or Firm*—Carlson, Gaskey & Olds, P.C.

(57) ABSTRACT

In order to start a turbine engine (10), high-pressure fluid is directed onto a turbine (34a) to cause rotation of the turbine and thereby start the turbine engine. In a disclosed embodiment, the high-pressure fluid is provided through a fluid outlet (120) in a vane (36a) positioned adjacent the turbine (34a). The high-pressure fluid is provided by an air source, which may be another turbine engine, especially where the turbine engine to be started is a tip turbine engine that is not the primary propulsion source.

29 Claims, 3 Drawing Sheets

U.S. PATENT DOCUMENTS

| | | | |
|---|---|---|---|
| 3,267,667 A | 8/1966 | Erwin | |
| 3,269,120 A | 8/1966 | Sabatiuk | |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,451,215 A * | 6/1969 | Barr .......................... | 60/787 |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flail | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Liston et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 7,021,042 B2 | 4/2006 | Law | |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |

FOREIGN PATENT DOCUMENTS

| | | |
|---|---|---|
| GB | 785721 | 11/1957 |
| GB | 1287223 | 8/1972 |
| GB | 2016597 | 9/1979 |
| GB | 2026102 | 1/1980 |
| GB | 2401655 | 11/2004 |
| JP | 10184305 | 7/1998 |
| WO | 9902864 | 1/1999 |
| WO | 02081883 | 10/2002 |
| WO | 2004092567 | 10/2004 |
| WO | 2006059986 | 6/2006 |
| WO | 2006059987 | 6/2006 |
| WO | 2006059993 | 6/2006 |
| WO | 2006112807 | 12/2006 |
| WO | 2006110125 | 2/2007 |

* cited by examiner

TURBINE BLOW DOWN STARTER FOR TURBINE ENGINE

This invention was conceived in performance of U.S. Air Force contract F33657-03-C-2044. The government may have rights in this invention.

BACKGROUND OF THE INVENTION

The present invention relates to turbine engines, and more particularly to a starter for a turbine engine, such as a tip turbine engine.

An aircraft gas turbine engine of the conventional turbofan type generally includes a forward bypass fan, a low pressure compressor, a high pressure compressor, a combustor, a high pressure turbine, and a low pressure turbine, all located along a common longitudinal axis. The low and high pressure compressors are rotatably driven to compress entering air to a relatively high pressure. This high-pressure air is then mixed with fuel in the combustor, where it is ignited to form a high energy gas stream. This gas stream flows axially aft to rotatably drive the high pressure turbine, which rotatably drives the high pressure compressor via a high pressure shaft. The gas stream leaving the high pressure turbine is expanded through the low pressure turbine, which rotatably drives the forward bypass fan and the low pressure compressor via a low pressure shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines include hollow fan blades through which core airflow flows such that the hollow fan blades operate as centrifugal compressors. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 20030192303; 20030192304; and 20040025490. The tip turbine engine provides a thrust-to-weight ratio equivalent to or greater than conventional turbofan engines of the same class, but within a package of significantly shorter length.

Conventional turbine engines typically include a starter mounted to an external accessory drive gearbox. However, conventional starters cannot be used in the tip turbine engine because the tip turbine engine does not include an external accessory drive gearbox.

SUMMARY OF THE INVENTION

In a turbine engine according to the present invention, high-pressure air is provided to the turbine to cause rotation of the turbine to start the turbine engine. The high-pressure air is provided through a fluid outlet upstream of the turbine. In the disclosed embodiment, the fluid outlet is provided in a vane positioned adjacent the turbine.

The high-pressure air is provided by an air source, which may be a compressor, stored compressed air, an air starter, a gas generation device (pyrotechnic or other), or another turbine engine. In applications where the turbine engine to be started is a tip turbine engine that is not the primary propulsion source, the high-pressure air may be provided by the primary turbine engine. For example, the high-pressure air may be supplied from the bleed air from the primary turbine engine.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
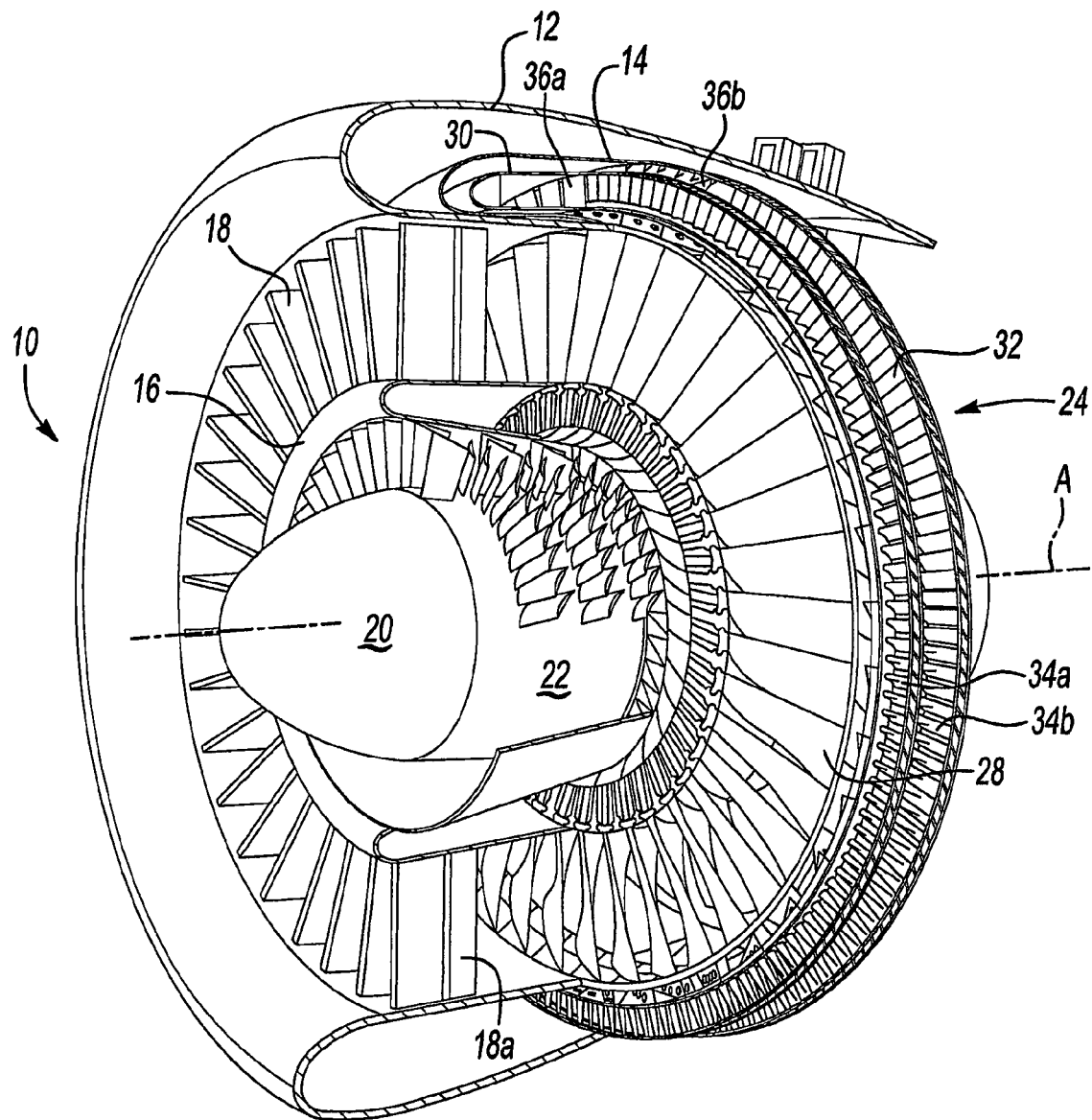
FIG. 1 is a partial sectional perspective view of a tip turbine engine.

FIG. 1 illustrates a general perspective partial sectional view of a tip turbine engine (TTE) type gas turbine engine 10. The engine 10 includes an outer nacelle 12, a rotationally fixed static outer support structure 14 and a rotationally fixed static inner support structure 16. A plurality of fan inlet guide vanes 18 are mounted between the static outer support structure 14 and the static inner support structure 16. Each inlet guide vane preferably includes a variable trailing edge 18a.

A nosecone 20 is preferably located along the engine centerline A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34a-b (two stages shown) which rotatably drive the hollow fan blades 28 relative a plurality of tip turbine vanes 36a-b which extend radially inwardly from the rotationally fixed static outer support structure 14. The annular combustor 30 is disposed axially forward of the turbine 32 and communicates with the turbine 32.

Figure 2:
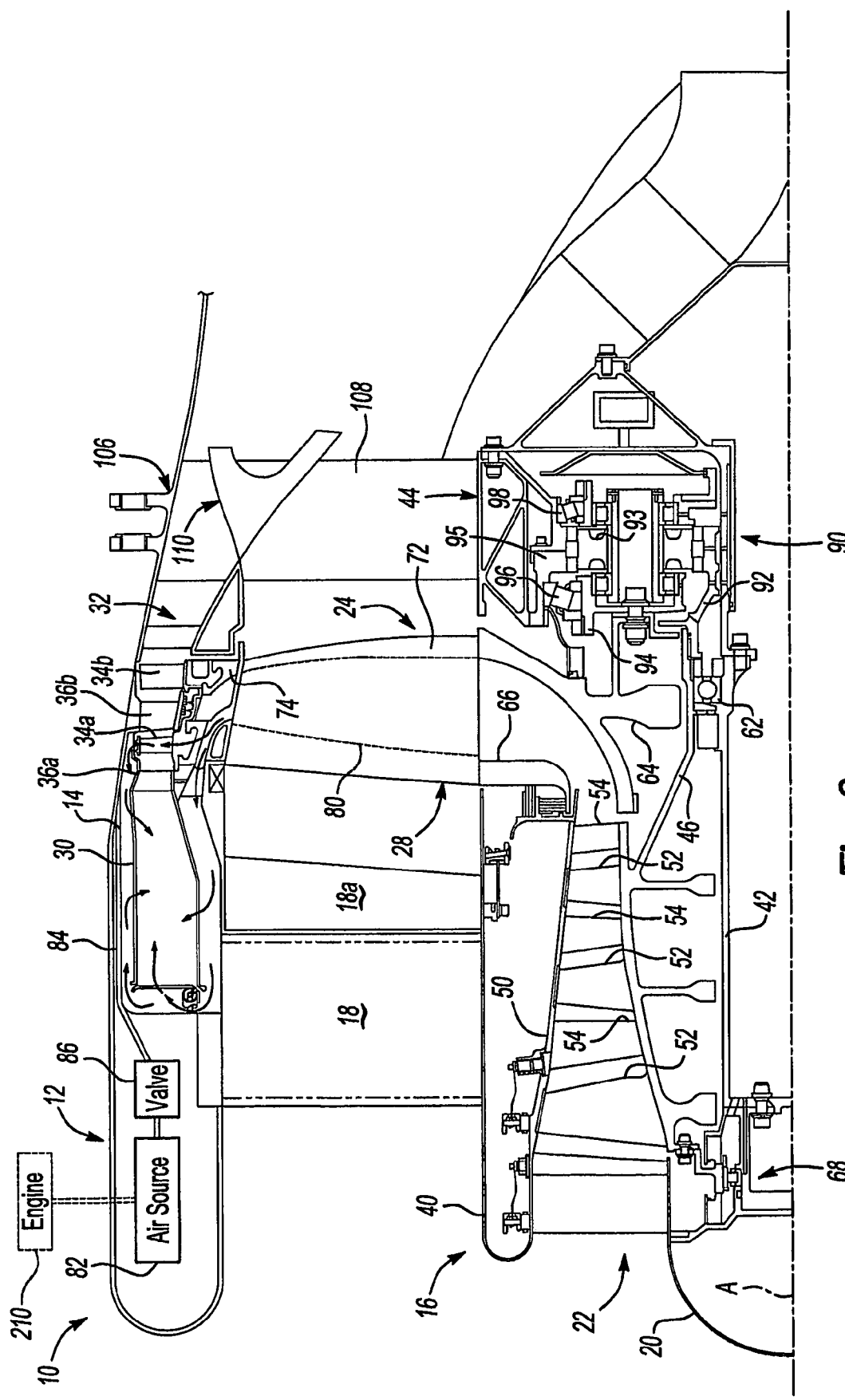
FIG. 2 is a longitudinal sectional view of the tip turbine engine of FIG. 1 along the engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46, from which a plurality of compressor blades 52 extend radially outwardly, and a fixed compressor case 50. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages each of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each hollow fan blade 28 includes an inducer section 66, a hollow fan blade section 72 and a diffuser section 74. The inducer section 66 receives airflow from the axial compressor 22 in a direction generally parallel to the engine centerline A and turns the airflow from an axial airflow direction toward a radial airflow direction. The airflow is radially communicated through a core airflow passage 80 within the hollow fan blade section 72 where the airflow is centrifugally compressed. The diffuser section 74 receives the airflow from the core airflow passage 80, and then diffuses the airflow and turns it once again toward an axial airflow direction toward the annular combustor 30. Preferably, the airflow is diffused axially forward in the engine 10; however, the airflow may alternatively be communicated in another direction.

The tip turbine engine 10 further includes an air source 82 of high-pressure fluid, such as air, for starting the tip turbine engine 10. The air source 82 is connected to a conduit 84 that provides the compressed air to a point just upstream of the first stage of the turbine blades 34a. In the embodiment shown, the conduit leads to the first stage of vanes 36a, just upstream from the turbine blades 34a. The air source 82 could be a compressor, stored compressed air, an air starter, a gas generation device (such as a pyrotechnic device or other), or other self-contained air source 82. A valve 86 between the air source 82 and the first stage of vanes 36a allows for modulated fluid flow from the source 82 during the engine starting sequence. The valve 86 is closed once the engine 10 is started and is self-sustaining. In applications where the tip turbine engine 10 is not the only turbine engine, the air source 82 could be a conduit or reservoir connected to another turbine engine 210. The other turbine engine 210 may be the primary means of propulsion, while the tip turbine engine 10 provides lift, control and/or supplementary propulsion. The other turbine engine 210 may be a conventional turbine engine or another tip turbine engine. In this case, high-pressure air for the air source 82 may be provided from the bleed air from the other turbine engine 210.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 may be an epicyclic gearbox, such as a planetary gearbox as shown, that is mounted for rotation between the static inner support housing 42 and the static outer support housing 44. The gearbox assembly 90 includes a sun gear 92, which rotates the axial compressor 22, and a planet carrier 94, which rotates with the fan-turbine rotor assembly 24. A plurality of first planet gears 93 each engage the sun gear 92 and a rotationally fixed ring gear 95. The first planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/or may provide a decrease in rotation speed.

Figure 3:
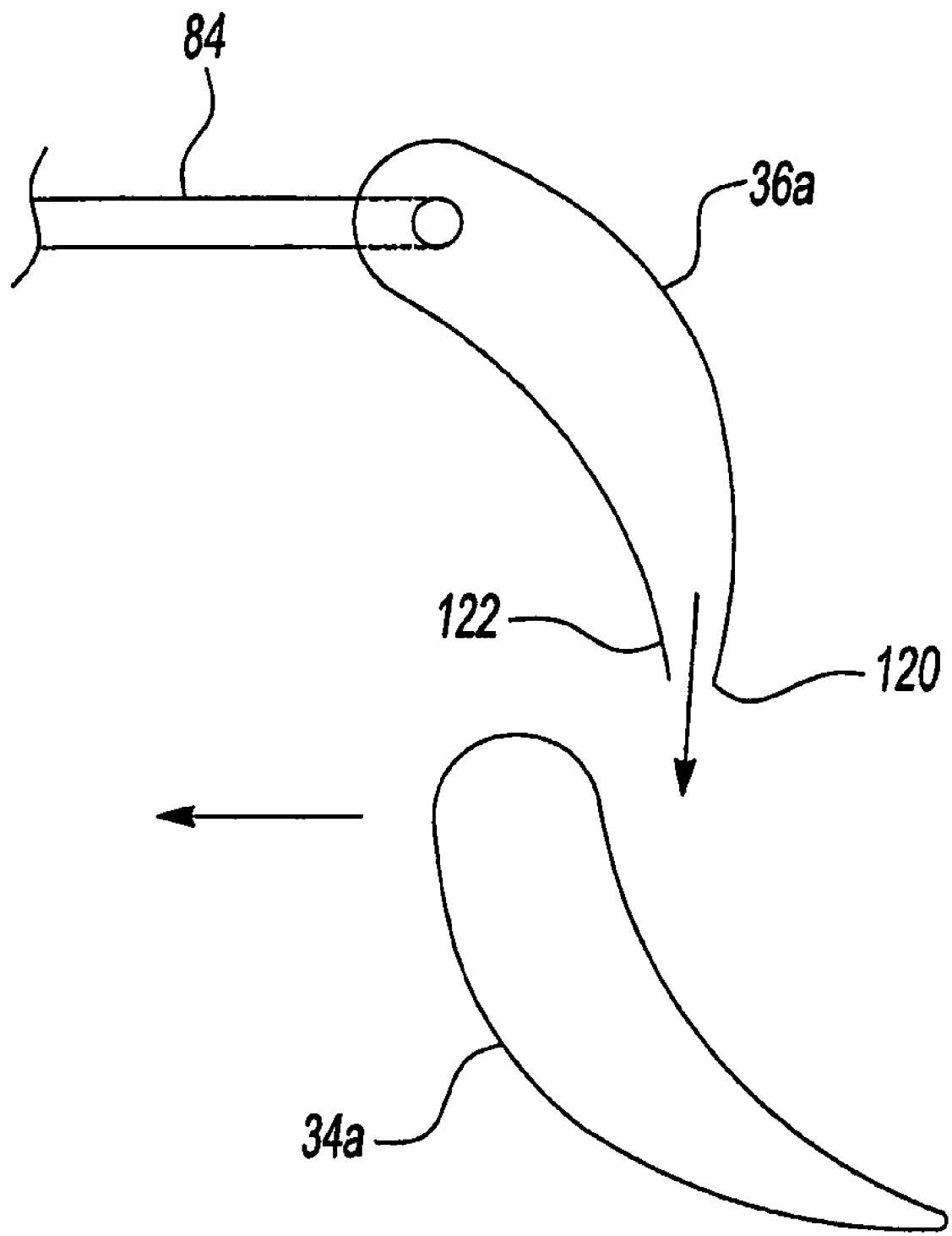
FIG. 3 is an enlarged view of the first stage of the turbine vanes and blades of FIG. 2.

FIG. 3 illustrates in more detail the interaction of the vanes 36a and turbine blades 34a (one of each shown). The vane 36a is supplied with high-pressure air via the conduit 84. The vane 36a includes a fluid outlet 120 at a trailing edge 122, though flow could also exit from slots on the pressure (convex) and/or suction (concave) sides of the airfoil. When high-pressure air is supplied before the tip turbine engine 10 is started, the fluid outlet 120 directs the high-pressure air directly onto the turbine blade 34a in a generally axial direction, which urges the turbine blade 34a rotatably about the axis of the turbine 32 (FIG. 2).

Referring to FIG. 2, rotation of the turbine blades 34a causes rotation of the fan turbine rotor assembly 24, which in turn causes the axial compressor rotor 46 to rotate. Rotation of the compressor blades 52 and the hollow fan blades 28 provides compressed air to the annular combustor 30, which can then initiate ignition of the fuel and normal operation of the tip turbine engine 10.

When the combustor 30 ignition takes place and the engine 10 is self-sustaining, the valve 86 is closed. Once in normal operation, the core airflow enters the axial compressor 22, where it is compressed by the compressor blades 52. The compressed air from the axial compressor 22 enters the inducer section 66 in a direction generally parallel to the engine centerline A and is then turned by the inducer section 66 radially outwardly through the core airflow passage 80 of the hollow fan blades 28. The airflow is further compressed centrifugally in the hollow fan blades 28 by rotation of the hollow fan blades 28. The diffuser section 74 receives air from the core airflow passage 80, and turns and diffuses the airflow axially forward in the engine 10 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34a-b mounted about the outer periphery of the fan-turbine rotor assembly 24 to drive the fan-turbine rotor assembly 24, which in turn rotatably drives the axial compressor 22 either directly or via the optional gearbox assembly 90. The fan-turbine rotor assembly 24 discharges fan bypass air axially aft to merge with the core airflow from the turbine 32 in an exhaust case 106.

A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the turbine blades 34a-b with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising:
   a fan having a plurality of radially extending fan blades, wherein at least one of the plurality of fan blades defines a compressor chamber extending radially therein, wherein rotation of the at least one fan blade provides centrifugal compression of core airflow;
   a turbine blade operatively coupled to the fan for rotatably driving the fan;
   a combustor for generating a high-energy gas stream to the turbine blade after the turbine engine is started, the centrifugally compressed core airflow being supplied to the combustor; and
   a fluid outlet supplying high-pressure fluid onto the turbine blade to cause rotation of the turbine blade to start the turbine engine before the combustor generates a high-energy gas stream, wherein the high-pressure fluid from the fluid outlet is distinct from the core airflow.

2. The turbine engine of claim 1 wherein the fluid outlet is formed in a vane adjacent the turbine blade.

3. The turbine engine of claim 1 wherein the fluid outlet is disposed between the combustor and the turbine blade.

4. The turbine engine of claim 1 wherein the turbine blade is disposed adjacent an outer periphery of the fan blades.

5. The turbine engine of claim 1 wherein the turbine engine is a first turbine engine and wherein the high-pressure fluid is from a second turbine engine, the second turbine engine generating the high-pressure fluid after the second turbine engine is started.

6. The turbine engine of claim 5 wherein the high-pressure fluid is bleed air from the second turbine engine.

7. The turbine engine of claim 1 further including an air compressor supplying the high-pressure fluid to the fluid outlet.

8. The turbine engine of claim 1 further including an air starter supplying the high-pressure fluid to the fluid outlet.

9. The turbine engine of claim 1 further including a gas generator supplying the high-pressure fluid to the fluid outlet.

10. The turbine engine of claim 1 further including a reservoir of stored compressed air supplying the high-pressure fluid to the fluid outlet.

11. A turbine engine comprising:
a fan having a plurality of radially extending fan blades, at least one of the plurality of fan blades defining a compressor chamber extending radially therein and rotation of the at least one fan blade provides centrifugal compression of core airflow;
a turbine for rotatably driving the fan, the turbine coupled to an outer periphery of the fan blades; and
a fluid outlet for supplying high-pressure fluid to the turbine to cause rotation of the turbine to start the turbine engine, wherein the high-pressure fluid from the fluid outlet does not pass through the compressor chamber defined by the at least one of the plurality of fan blades.

12. The turbine engine of claim 11 wherein the fluid outlet is formed in a vane adjacent the turbine.

13. The turbine engine of claim 11 wherein the fluid outlet is disposed between a combustor and the turbine.

14. The turbine engine of claim 11 wherein the turbine engine is a first turbine engine and wherein the high-pressure fluid is from a second turbine engine, the second turbine engine generating the high-pressure fluid after the second turbine engine is started.

15. The turbine engine of claim 14 wherein the high-pressure fluid is bleed air from the second turbine engine.

16. The turbine engine of claim 11 further including an air compressor supplying the high-pressure fluid to the fluid outlet.

17. The turbine engine of claim 11 further including an air starter supplying the high-pressure fluid to the fluid outlet.

18. The turbine engine of claim 11 further including a gas generator supplying the high-pressure fluid to the fluid outlet.

19. The turbine engine of claim 11 further including a reservoir of stored compressed air supplying the high-pressure fluid to the fluid outlet.

20. A method for starting a turbine engine including the steps of:
directing high-pressure fluid onto a turbine blade radially outward of a fan of the turbine engine, the fan having a plurality of radially extending fan blades, at least one of the plurality of fan blades defining a compressor chamber extending radially therein, wherein the high-pressure fluid does not pass through the compressor chamber defined in the at least one of the plurality of fan blades;
causing rotation of the turbine blade and the fan with the high-pressure fluid, rotation of the at least one fan blade providing centrifugal compression of core airflow; and
starting the turbine engine based upon the rotation of the turbine blade.

21. The method of claim 20 further including the step of causing rotation of a fan with the rotation of the turbine blade.

22. The method of claim 20 further including the step of directing the high-pressure fluid from an outlet between a combustor and the turbine blade.

23. The method of claim 20 wherein the turbine engine is a first turbine engine and the high-pressure fluid is generated by a second turbine engine.

24. The method of claim 23 wherein the first turbine engine is a tip turbine engine.

25. The method of claim 24 wherein the second turbine engine is a conventional, axial flow turbine engine.

26. The method of claim 20 further including an air compressor supplying the high-pressure fluid.

27. The method of claim 20 further including an air starter supplying the high-pressure fluid.

28. The method of claim 20 further including a gas generator supplying the high-pressure fluid.

29. The method of claim 20 further including a reservoir of stored compressed air supplying the high-pressure fluid.

* * * * *